United States Patent
Wang

(10) Patent No.: US 6,925,505 B2
(45) Date of Patent: Aug. 2, 2005

(54) METHOD AND DEVICE FOR DATA TRANSMISSION CONTROL BETWEEN IDE APPARATUSES

(75) Inventor: Hong-Chuan Wang, Taipei (TW)

(73) Assignee: EPO Science & Technology Inc., Taipei (TW)

( * ) Notice: Subject to any disclaimer, the term of this patent is extended or adjusted under 35 U.S.C. 154(b) by 270 days.

(21) Appl. No.: 10/372,940

(22) Filed: Feb. 26, 2003

(65) Prior Publication Data

US 2004/0168000 A1 Aug. 26, 2004

(51) Int. Cl.[7] ............ G06F 13/00; G06F 13/12; G06F 13/14; G06F 13/38; G06F 3/06
(52) U.S. Cl. ............... 710/21; 710/2; 710/8; 710/14; 710/20; 710/31; 710/32; 710/33; 710/36; 710/38; 710/61; 710/62; 710/64; 710/72; 710/74; 710/316; 711/100
(58) Field of Search .............. 710/1, 2, 5–8, 710/14, 20–21, 31–33, 36, 38, 52, 53, 61–64, 72–74, 100, 104; 711/112, 316, 100, 111

(56) References Cited

U.S. PATENT DOCUMENTS

| | | | | |
|---|---|---|---|---|
| 5,058,004 A | * | 10/1991 | Ravid | 710/2 |
| 5,446,877 A | * | 8/1995 | Liu et al. | 714/1 |
| 5,649,233 A | * | 7/1997 | Chen | 710/8 |
| 5,867,733 A | * | 2/1999 | Meyer | 710/74 |
| 5,964,848 A | * | 10/1999 | Kikinis et al. | 710/2 |
| 6,108,724 A | * | 8/2000 | Din | 710/52 |
| 6,535,934 B2 | * | 3/2003 | Troxel et al. | 710/31 |
| 6,539,442 B1 | * | 3/2003 | Kato et al. | 710/74 |
| 6,606,672 B1 | * | 8/2003 | Chien | 710/21 |

* cited by examiner

Primary Examiner—Jeffrey Gaffin
Assistant Examiner—Tanh Q. Nguyen
(74) Attorney, Agent, or Firm—Troxell Law Office, PLLC

(57) ABSTRACT

A method and a device for controlling data transmission between IDE apparatuses allow an IDE controller of an IDE control device to send read control signal to an IDE apparatus via a set of IDE interfaces and a signal control transmission line and then to send write control signal to another IDE apparatus via another set of IDE interfaces and another signal control transmission line. Thus, the output data from the IDE apparatus through the data transmission line can be accelerated the transmission speed thereof between IDE apparatuses so as to save the time for transmitting data.

5 Claims, 3 Drawing Sheets

METHOD AND DEVICE FOR DATA TRANSMISSION CONTROL BETWEEN IDE APPARATUSES

BACKGROUND OF THE INVENTION

1. Field of the Invention

The present invention relates to a method and a device for controlling data transmission and particularly to a control method and a control device for data transmission between IDE apparatuses.

2. Description of Related Art

Generally, an ordinary CD-ROM drive connects with a personal computer or IDE control device by way of IDE interface (Integrated Device Electronics Interface) to perform data transmission.

Referring to FIG. 1, a conventional IDE control device includes an IDE controller 10, two IDE interfaces 21, 22 and a memory bus 101 so as to connect with a memory 102. An IDE apparatus 11 is a CD-ROM drive associated with an IDE interface 23. Another IDE apparatus 12 can be a CD-RW associated with the IDE interface 24. The two IDE interfaces 21, 23 are connected to each other with a flexible flat cable or a bus and, by the same token, the two IDE interfaces 22, 24 are connected to each other with a flexible flat cable or a bus too. The flexible flat cable or the bus includes signal control transmission lines 31, 32 and data transmission lines 33, 34.

Once the data is ready to be transmitted, the IDE controller 10 of the IDE control device sends read control signal to the IDE apparatus 11 first via the signal control transmission line 31 to allow the IDE apparatus 11 outputting data via the data transmission line 33 and the output data being saved in the memory 102. Then, the IDE controller 10 sends write control signal to the IDE apparatus 12 to allow the output data being written in the IDE apparatus 12 from the memory 102 through the data transmission line 34.

The preceding conventional way for data transmission between IDE apparatuses is briefly in that the data of the IDE apparatus 11 is sent to the memory 102 first and then sent to the IDE apparatus 12 from the memory 102. Apparently, the conventional way provides a slower data transmission speed.

Further, U.S. Pat. No. 6,108,724 discloses a fast IDE driver to drive transfers, which allows an IDE controller to connect with a first-in-first-out transfer buffer. While the data is transmitted between the IDE apparatuses, the IDE controller makes output data from one of the IDE apparatuses being saved in the first-in-first-out transfer buffer temporarily instead of being saved in the master memory. Then, the output data is sent to another IDE apparatus via the first-in-first-out transfer buffer to enhance the speed of data transmission.

SUMMARY OF THE INVENTION

The crux of the present invention is to further enhance the speed of data transmission between IDE apparatuses.

Accordingly, a primary object of the present invention is to provide a method and a device for controlling data transmission between IDE apparatus and the method and the device can accelerate the speed of the data transmission between the IDE apparatuses substantially and the time for data transmission can be saved effectively.

BRIEF DESCRIPTION OF THE DRAWINGS

The present invention can be more fully understood by reference to the following description and accompanying drawing, in which.

DETAILED DESCRIPTION OF THE PREFERRED EMBODIMENT

Figure 1:
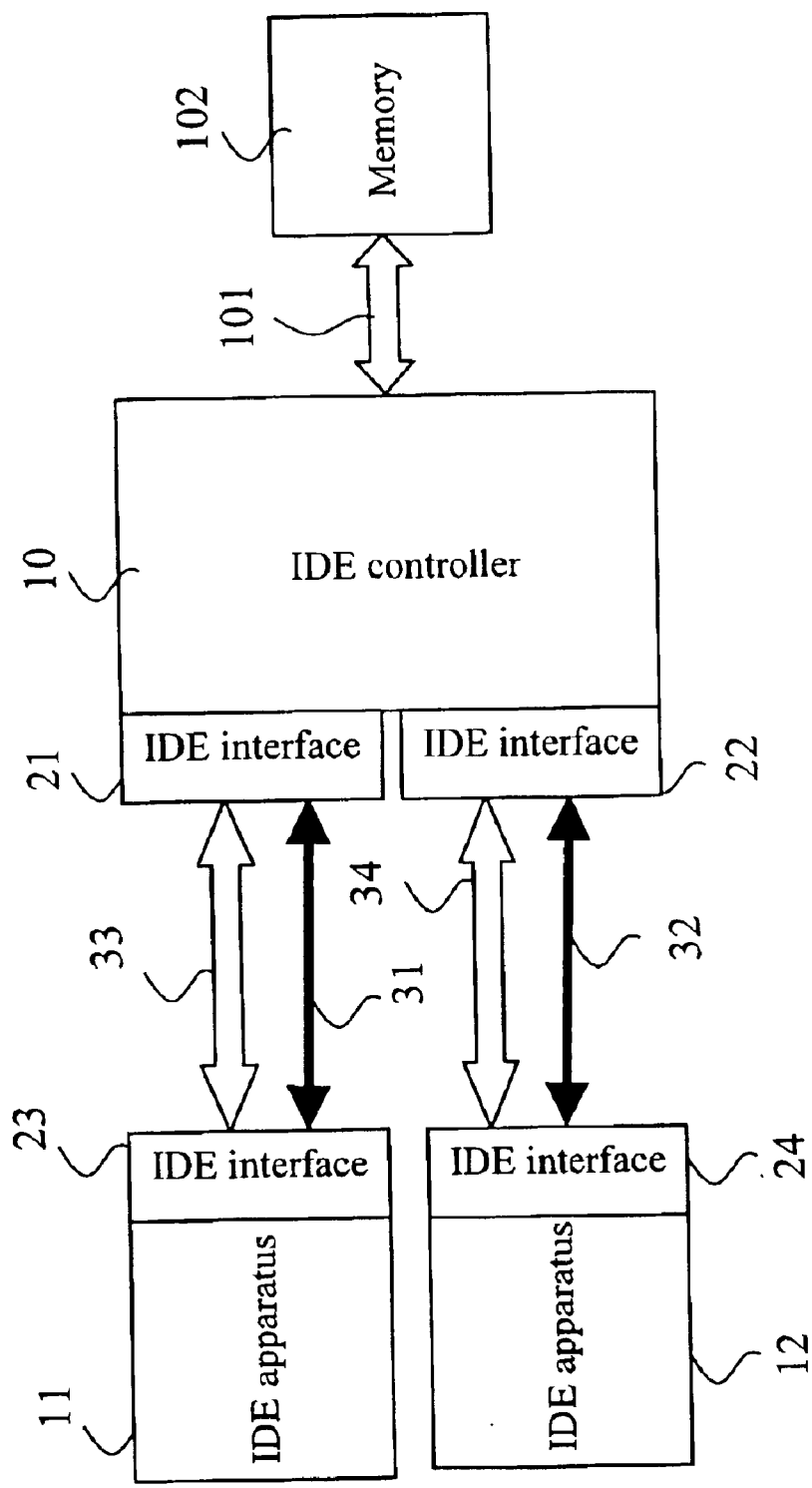
FIG. 1 is a block diagram of functional structure for data transmission between two IDE apparatuses with conventional way.
Figure 2:
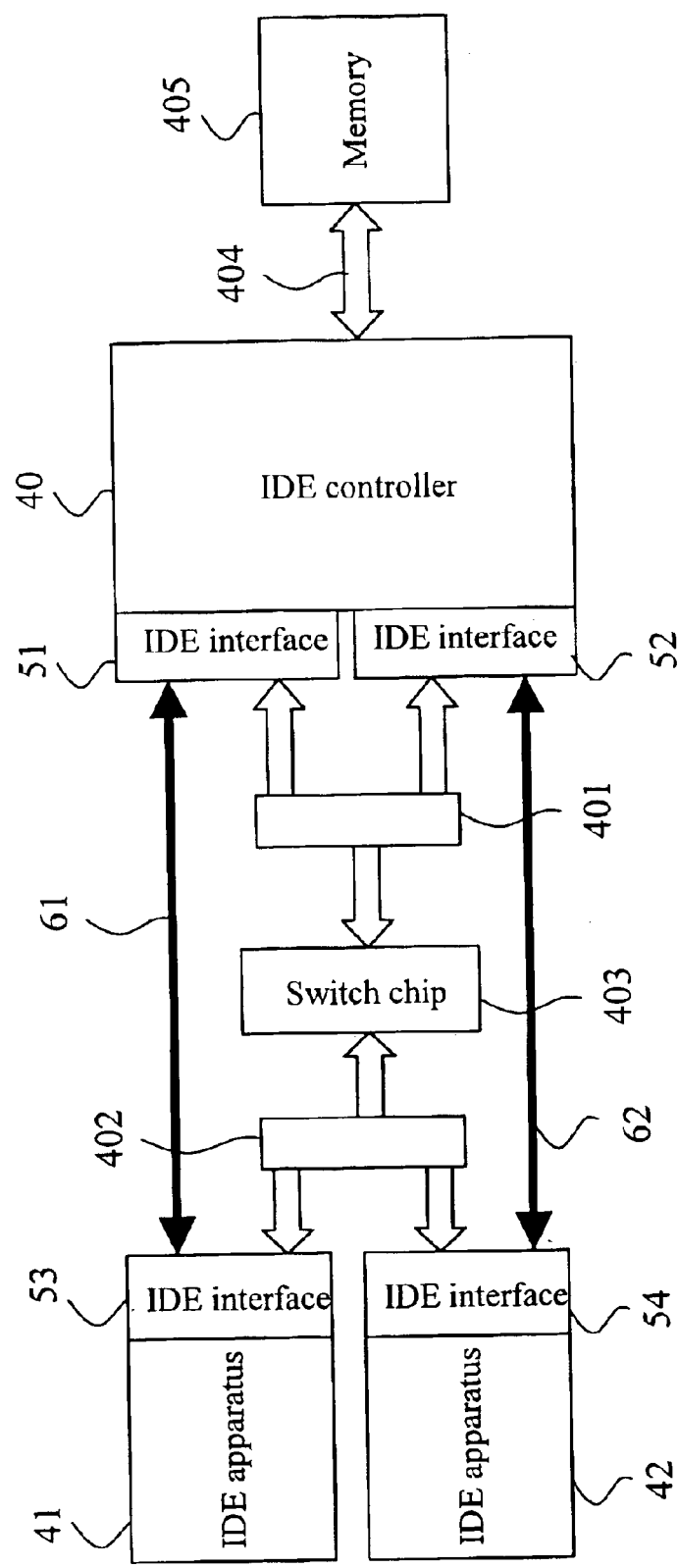
FIG. 2 is a block diagram of functional structure for data transmission between two IDE apparatuses according to the present invention.

Referring to FIG. 2, an IDE control device according to the present invention includes an IDE controller 40 associated with two IDE interfaces 51, 52 and a data transmission line 401 such as an IDE data bus, which connects with transmitting ends of the two IDE interfaces 51, 52. The IDE control device further includes another data transmission line 402 and two IDE interfaces 53, 54. The two IDE interfaces 53, 54 at data transmitting ends thereof connect with the data transmission line 402. Furthermore, the two IDE interface 53, 54 are joined to an IDE apparatuses 41, 42 respectively. Besides, the two data transmission lines 401, 402 connect with a switch chip 403 such as Chip No. 74245 respectively. The IDE interfaces 51, 53 are connected to each other via a control transmission line 61 and the IDE interfaces 52, 54 are connected to each other via another control transmission line 62.

A control method of the present invention allows the IDE controller 40, such as an ALTERA EPM7032S or 7064S programmable chip, sends out a read control signal to IDE apparatus 41 via the IDE interface 51, the control transmission line 61 and the IDE interface 53 so that the data can be output through the data transmission line 402. The IDE controller 40 then sends out a write control signal to the IDE apparatus 42 via the IDE interface 52, the control transmission line 62 and the IDE interface 54 so that the output data from the IDE unit 41 can be written in through the data transmission line 402.

Further, the IDE controller 40 of the present invention can be connected to a memory bus 404 so as to connect a memory 405. A switch of the switch chip 403 can be controlled to allow the data being transmitted between the two IDE apparatuses 41, 42 and the memory 405 by way of the two data transmission lines 401, 402 and the memory bus 404.

Figure 3:
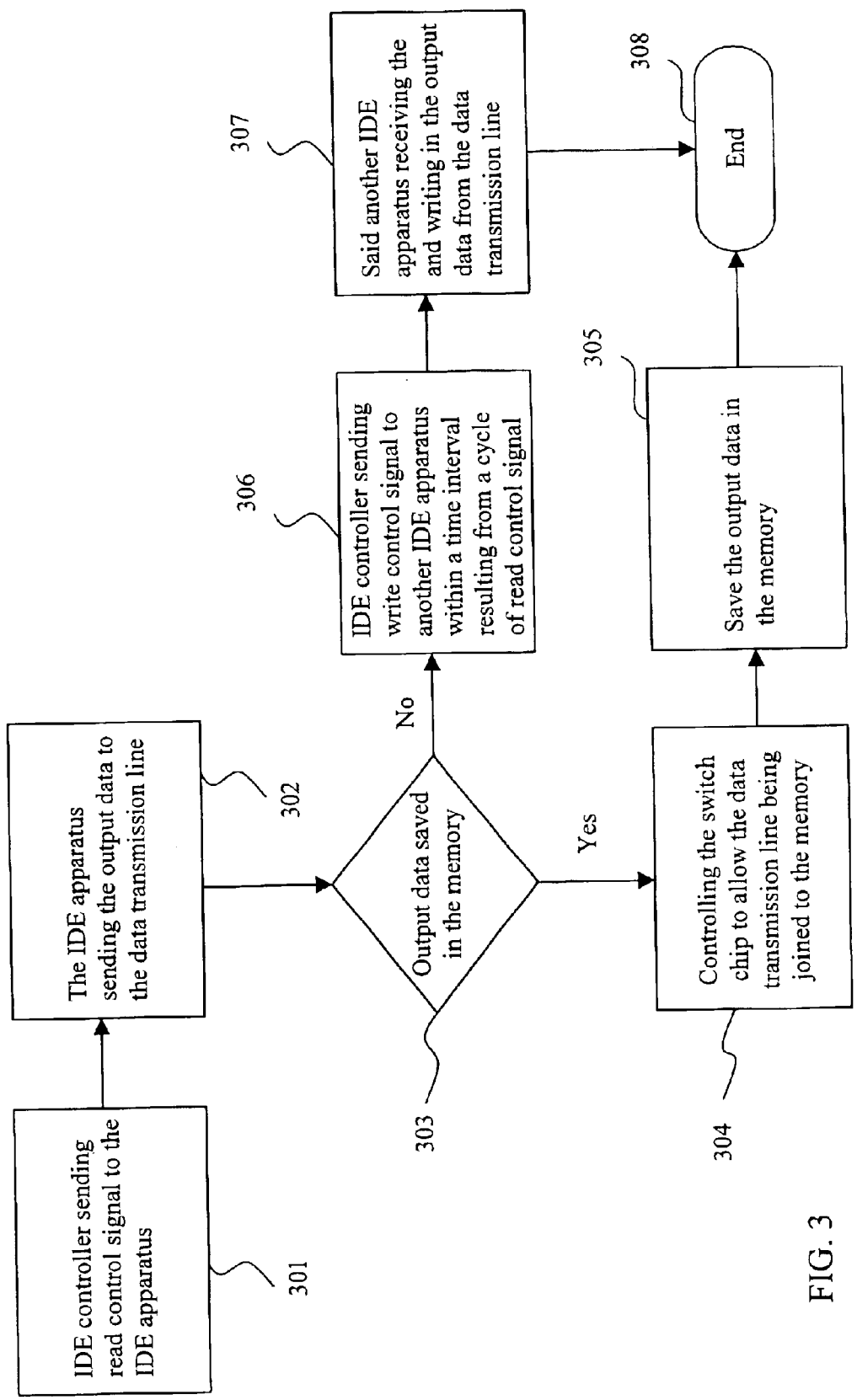
FIG. 3 is a flow chart illustrating an embodiment of the present invention.

Referring to FIG. 3, the control method of the present invention includes the following steps:

301 The IDE controller sends read control signal to the IDE apparatus.

302 The IDE apparatus transmits output data to a data transmission line.

303 executing step 306 in case of the output data being not necessary to be saved in the memory, otherwise, executing next step.

304 The switch chip is controlled to allow the data transmission line being joined to the memory.

305 Save the output data in the memory and then executing step 308.

306 The IDE controller further sends a write control signal to another IDE apparatus within a time interval resulting from a cycle of read control signal;

307 Said another IDE apparatus receives the output data from the data transmission line and the output data is written in said another IDE apparatus.

308 The procedure of the present invention is finished.

It is appreciated that the present invention provides a method and a device for controlling data transmitted between IDE apparatuses via data transmission lines directly without the need of the data being saved in a memory or a first-in-first-out buffer in advance. Thus, the speed of data transmission can be enhanced tremendously and the data transmission between the IDE apparatuses and the memory can be performed by means of switch chip design.

While the invention has been described with reference to a preferred embodiment thereof, it is to be understood that modifications or variations may be easily made without departing from the spirit of this invention, which is defined by the appended claims.

What is claimed is:

1. A method for controlling data transmission between IDE apparatuses, comprising following steps:

(1) an IDE controller sending read control signal to an IDE apparatus;

(2) The IDE apparatus transmitting output data to a data transmission line;

(3) The IDE controller sending write control signal to another IDE apparatus within a time interval resulting from a cycle of the read control signal; and (4) Said another IDE apparatus receiving the output data from the data transmission line and the output data being written in said another IDE apparatus.

2. The method for controlling data transmission between IDE apparatuses as defined in claim 1, wherein the step (3) is executed after the step (2) in case of the output data in the step (2) being not saved in a memory, otherwise, following steps are executed:

a switch chip being controlled to allow the data transmission line being joined to the memory; and the output data being saved in the memory and, then, terminating the data transmission and the step (3) being not executed anymore.

3. A device for controlling data transmission between IDE apparatuses, comprising an IDE controller, being associated with two IDE interfaces and each of the IDE interfaces having a transmission end respectively;

a data transmission line, connecting with the respective transmission end of the two IDE interfaces;

two further interfaces, each of the two further interfaces having a transmission end respectively;

another data transmission line, connecting with the respective transmission end of the two further interfaces;

a switch chip, being connected to the two data transmission lines respectively; and two control signal transmission lines, connecting with one of the interfaces and one of said further interfaces respectively.

4. The device for controlling data transmission between IDE apparatuses as defined in claim 3, wherein the data transmission line is a data bus.

5. The device for controlling data transmission between IDE apparatuses as defined in claim 3, the IDE controller further connects with a memory bus so as to connect with a memory.

* * * * *